United States Patent [19]

Dones et al.

[11] Patent Number: 4,504,699
[45] Date of Patent: Mar. 12, 1985

[54] SEALABLE RECOVERABLE ARTICLES

[75] Inventors: Roberto Dones, Milan; David G. Street, Abbiategrasso, both of Italy

[73] Assignee: Raychem Pontoise S.A., Saint-Ouen l'Aumone, France

[21] Appl. No.: 463,684

[22] Filed: Feb. 3, 1983

[30] Foreign Application Priority Data

Feb. 8, 1982 [GB] United Kingdom ............... 8203555

[51] Int. Cl.³ ............................................. H01R 4/00
[52] U.S. Cl. ................................. 174/84 R; 174/76; 174/84 C; 174/87; 174/DIG. 8
[58] Field of Search .................... 174/76, 84 R, 84 C, 174/87, DIG. 8; 29/855, 856, 858, 859, 869, 870, 871; 324/72.5

[56] References Cited

U.S. PATENT DOCUMENTS

| | | | |
|---|---|---|---|
| 2,027,962 | 1/1936 | Currie | 174/DIG. 8 |
| 2,866,058 | 12/1958 | Hebenstreit | 174/84 R |
| 2,981,787 | 4/1961 | Brautigam et al. | 174/90 X |
| 3,243,211 | 3/1966 | Wetmore | 174/87 |
| 3,456,232 | 7/1967 | Dupre . | |
| 3,678,174 | 7/1972 | Ganzhorn | 174/84 R |
| 3,768,005 | 10/1973 | Louks | 324/72.5 X |
| 4,181,775 | 1/1980 | Corke | 174/DIG. 8 X |
| 4,208,788 | 6/1980 | Siden | 29/871 X |
| 4,282,396 | 8/1981 | Watine et al. | 174/DIG. 8 X |
| 4,283,596 | 8/1981 | Vidakovits et al. | 174/87 X |
| 4,304,959 | 12/1981 | Vidakovits et al. | 174/DIG. 8 X |
| 4,332,975 | 6/1982 | Dienes | 174/76 |
| 4,378,448 | 3/1983 | Park et al. | 174/DIG. 8 X |

FOREIGN PATENT DOCUMENTS

| | | |
|---|---|---|
| 1116878 | 6/1968 | United Kingdom . |
| 1175428 | 12/1969 | United Kingdom . |
| 1177915 | 1/1970 | United Kingdom . |

*Primary Examiner*—A. T. Grimley
*Assistant Examiner*—Morris H. Nimmo
*Attorney, Agent, or Firm*—James W. Peterson

[57] ABSTRACT

The device for enclosing at least part of an elongation object, preferably a connection between electrical conductors, comprising a hollow dimensionally recoverable article having an aperture that communicates between the interior and the exterior of the article, and a quantity of material which seals an aperture. The material is self sealing so that it will allow penetration of a test probe through the material and will continue to seal the article after removal of the probe. Advantageously the article contains an arrangement for connecting electrical conductors, for example a solder insert or crimping connector.

19 Claims, 6 Drawing Figures

2 ADHESIVE
SLEEVE
3 SOLDER
PLATE
5 SEAL

7 PROBE

5 SEAL

SEALABLE RECOVERABLE ARTICLES

The present invention relates to recoverable articles which can provide environmental sealing of elongate substrates such as connections between electrical wires.

A recoverable article is an article the dimensional configuration of which may be made substantially to change when subjected to a certain treatment, and a heat recoverable article is an article whose configuration changes on heating.

Usually these articles recover towards an original shape from which they have previously been deformed but the term "recoverable", as used herein, also includes an article which adopts a new configuration, even if it has not been previously deformed.

In their most common form, heat recoverable articles comprise a heat-shrinkable sleeve (which may be tubular or wraparound) made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Pat. No. 1,440524, an elastomeric member such as an outer tubular member is held in a stretched state by a second member, such as an inner tubular member, which, upon heating weakens and thus allows the elastomeric member to recover.

Recoverable articles are particularly useful for providing environmental sealing since the substrate to be sealed can easily be enclosed by the article in its unrecovered state, and recovery, generally shrinking, effected to provide the seal. Precise tolerances between the sealing article and the substrate to be sealed are thus not necessary.

Where the recoverable article is a sleeve, the substrate to be sealed can be slid within it (or the sleeve wrapped around the substrate) and the ends of the sleeve shrunk down to provide the seal. This is particularly suitable for sealing connections between electrical wires, in which case the ends of the sleeve will be shrunk down onto the ingoing wires. The technique is applicable to sealing connections between individual conductors and also to sealing a splice between multiconductor cables. In the first of these applications the recoverable sleeve conveniently contains solder for electrical connection and hot-melt adhesive for further sealing, as described in for example U.S. Pat. Nos. 3,243,211 and 4,282,396, the complete article thus effecting electrical connection, environmental sealing and strain relief, by the simple operation of heating. This specification, and others referred to herein, is incorporated by reference. Such devices are made and sold under the Raychem Trade Mark, SOLDER SLEEVE.

According to one aspect, the present invention provides a device for enclosing at least part of an elongate object for example one or more electrical conductors, which comprises a hollow, dimensionally recoverable article which is capable of enclosing the object and which has an aperture that communicates between the interior and the exterior of the article, and a quantity of material which, at least after the article has been recovered, seals the aperture but which can be penetrated by a probe, the material being self-sealing so that it will seal the aperture after removal of the probe.

According to a preferred aspect, the present invention provides a device for forming and enclosing an electrical connection between a plurality of electrical conductors, which comprises a hollow, dimensionally recoverable article into which the conductors can be inserted, the article containing an arrangement for electrically connecting the conductors and a quantity of material which can be penetrated by a probe inserted into the article from the exterior thereof, the material being self-sealing so that, after removal of the probe, it will seal any aperture formed in the article by the probe. In the preferred aspect the recoverable article preferably has an aperture that communicates between the interior and the exterior of the article, which aperture is sealed by the self-sealing material at least after the article has been recovered.

By self-sealing, we mean the ability automatically to restore impermeability to moisture after puncture of the material when part of the article is penetrated by, for example a probe. The ability of the material to be self-sealing as defined herein may be imparted to materials that are not inherently self sealing by the construction of the device. Thus for example a plastically deformable material that is not inherently self sealing may be used in a device in which the recoverable article is designed so as to exert an unresolved recovery force on the material after recovery of the article. The unresolved recovery force may be caused by forming the article initially with dimensions that are smaller than those of the connection to be enclosed and expanding the article to render it dimensionally recoverable so that, when the article is recovered onto the connection it will be restrained by the connection from recovering to its full extent. In this case, a material such as a mastic may be positioned in the article so that it lies in the direction of the unresolved recovery forces. When the mastic has been penetrated by a probe and the probe has been removed the unresolved recovery forces will then force the mastic into any aperture formed by the probe and cause the mastic to seal it. Preferably, however, the material is inherently self-sealing, that is to say, the material will seal any aperture formed therein or in the article after removal of the probe even if no compresive forces are exerted on the material. In general, the probe will simply part the self-sealing material, but it is envisaged that the self-sealing properties could be achieved even if stock were removed by, for example, drilling.

The aperture may be closed by means in addition to the self-sealing material. If it is, then the probe will have to penetrate this additional means in order to reach the inside of the recoverable article. However, when the probe is removed it is not necessary that the additional means is re-sealed since it is the self-sealing means itself which restores impermeability. This is particularly relevant to the situation where it is the recoverable article itself which provides the additional means; here the recoverable article could be a tube closed at one end with the self-sealing material adjacent that closed end. However, the preferred arrangement is one in which the recoverable article is a sleeve closed at one end by the self-sealing material and open at the other end for insertion of conductors to be connected. The open end will become sealed on recovery.

The invention also provides a method of forming a testable sealed electrical connection between a plurality of electrical conductors, which comprises the steps of:
(a) establishing an electrical connection between the conductors; and
(b) enclosing the electrical conductors in a hollow dimensionally recoverable article and recovering the article about the conductors;

the article containing a quantity of material which can be penetrated by a probe inserted into the article from the exterior thereof to test the connection, and the material being self sealing so that, after removal of the probe, it will seal any aperture formed in the article by the probe, steps (a) and (b) being effected in any order or simultaneously.

Thus the electrical connection may first be formed and the connection may then be enclosed by the recoverable article or alternatively, when the hollow article contains a connector arrangement, it may be positioned about the conductors and recovered and subsequently the connection may be made from example by crimping. Preferably however the electrical connection of step (a) is established during step (b) for example by providing the recoverable article with a connector arrangement e.g. a connector block, crimp connector or solder, in which case the conductors are enclosed in the article and, in the case of a crimp or block connector, the connection may be made followed by recovery of the article. In the case of solder and an article that is heat-recoverable, it is possible for the connection to be established as the article is recovered by application of heat.

The sealed electrical connection may be tested by inserting a test probe through the material to communicate with the interior of the article and withdrawing the probe after completion of the test, and the material will seal any aperture formed in the article by the probe. The test may be any of a number of tests that it may be desired to perform on the connection, for example the insertion of a cannula to perform a gas analysis. However, the test will usually comprise inserting an electrically responsive probe through the material into conductive contact with the connector for example to ascertain the quality of the connection or to identify which of the multitude of connectors have been connected either immediately after the connection has been made or after a period of time has elapsed, in which case the test may be used to determine what further steps are to be performed either on the connection in question or on any other conductors. The device also enables tests to be performed before any operation on the conductor is performed, e.g. to determine whether or not the conductor or connection is live.

The nature and size of the self-sealing material will depend on the type of closure with which it is to be used. Where electrical components are concerned sealing is preferably provided against water and against contaminants that water is likely to contain. Resistance to other chemicals may, of course, be desirable. It is clear that if the device as a whole has to be resistant in this way, then the self-sealing material will require corresponding properties if it is not to provide a region of weakness in the device. The factors to be considered will include whether the self-sealing material need be self-supporting, whether it will be subjected to a pressure difference, what temperature, chemical and mechanical conditions it will encounter, and what type of probe it need admit. In the case of certain electrical components e.g. those used in telecommunication cables, the material will generally be capable of resisting a pessure equivalent to at least 20 cm of water, thus enabling the device to pass the high altitude immersion test required of some aerial telephone cables. With some preferred embodiments of this invention, temperatures over 50° C. can easily be resisted with cycling and water immersion, and a temperature range of 60° to 200° C. can be withstood. It is essential that the material is self-sealing after the article has been recovered, and the self-sealing properties must therefore survive whatever treatment is necessary to cause recovery (the self-sealing material will generally be installed in the factory long before the article is used on site). Whether or not it is self-sealing before recovery is not critical.

Preferred materials that may be used for the self-sealing material include those having a complex viscosity of not more than $10^9$ more preferably not more than $10^8$, especially not more than $10^7$ and most especially not more than $10^6$ poise but preferably at least $10^3$ and especially at least $10^4$ poise measured at $10^{-1}$ radian s$^{-1}$ and a strain rate of 5%. The complex viscosity may be measured by means of a parallel plate mechanical spectrameter for example as sold by "Rheometrics Inc." Where the material is a solid e.g. a silicone elastomer, the material may advantageously have a Shore A hardness of 10 to 200, preferably from 20 to 100, and most preferably from 30 to 70, and an elongation to break of at least 30%, more preferably at least 60% especially at least 100% and most especially at least 200% although in general there is no advantage in using materials having an elongation of more than 1000%.

The preferred self-sealing material is an elastomer, for example an RTV silicone. This material has the advantage that it can support itself and can be secured within the end of a recoverable sleeve by recovering that end around it. Any unresolved recovery of the article can aid the self-sealing properties by putting the material under compression. It is thus preferred that the portion of the article which houses the self-sealing material is itself recoverable.

An insulating gel may also be used for the self sealing material. An example of a suitable gel is one having a cone penetration value of approximately 150 to 350 ($10^1$ mm), an ultimate elongation of at least 200%, a maximum tensile strength of 20 psi and a cohesive strength greater than its adhesive strength. Such an insulating gel may be prepared by extending a conventional aliphatic polyurethane composition with an admixture of mineral oil and vegetable oil from approximately 70 to 80%; the ratio of the mineral oil to vegetable oil being approximately 0.7 to 2.4. Such an insulating gel is tacky, hydrolytically stable, moisture insensitive, and electrically insulating having a volume resistivity of about $10^9$ ohms centimeter.

A mastic can be used in situations where elastomeric properties are not critical, but this may sometimes be rather soft, and is generally best supported. It may for example be provided between a metal insert and the blind end of a heat recoverable cap. The probe would then be passed through the end of the cap and further through the mastic. However, as mentioned above, mastics are not inherently self-sealing, and so if a mastic is used it is required that the mastic be subject to pressure, for example pressure caused by unresolved recovery of the article, in order for it to provide a seal after penetration.

A third type of material that may be used is penetrable foam, especially closed cell foam. When installed in the end of a sleeve it can be compressed by recovering the sleeve to improve its self-sealing properties, it will however generally be less strong than a rubber and may require support.

The size and shape of the recoverable article will depend of course on the size and shape of the article to be environmentally sealed. A preferred use of the invention is, however, in connecting the individual wires in telephone cables.

Several forms of device according to the invention will now be described by way of example with reference to the accompanying drawings in which.

Figure 1:
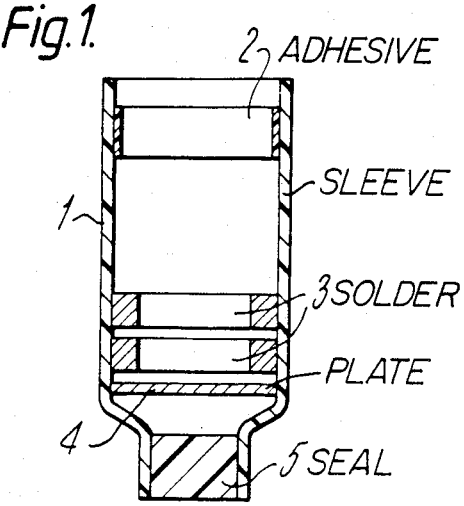
FIG. 1 is a section through one form of device according to the invention for connecting wires for example of a telephone cable.
Figure 2:
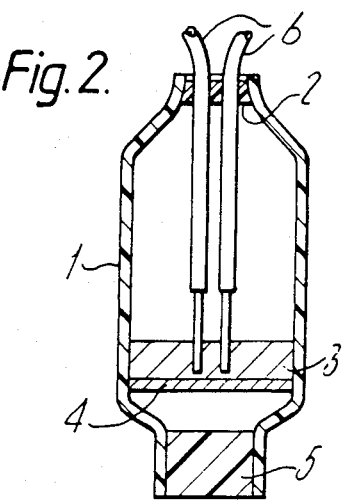
FIG. 2 is a section through the device shown in FIG. 1 after installation.

Referring initially to FIGS. 1 and 2 of the accompanying drawings, a recoverable sleeve 1 contains conducting rings of solder 3, or of other fusible conducting material, at one end thereof, and a thermoplastic insert such as a ring of hot-melt adhesive 2 at the other end. The rings of solder 3 are adjacent to a conducting, preferably a tinned or otherwise solder-wettable copper, retaining plate 4. Two wires 6 stripped at their ends are inserted into the open end of the sleeve 1 sufficiently far to reach the solder rings 3 as shown in FIG. 2. The lower end of the sleeve 1 as shown provides a passageway or aperture that is sealed by self-sealing material 5. The precise means by which material 5 is retained in place is not critical. In the embodiment illustrated in FIGS. 1 and 2 it is retained by a lower portion of the sleeve 1 that has been shrunk on to it, a second portion of the sleeve remaining recoverable. Alternative arrangements that may be used include producing the sleeve 1 with a recess into which the material 5 is snap fitted, or simply to bond the material 5 in place, or to introduce the material as a liquid and cure it in place. In each of these cases the self-sealing material is retained in place by the article, before complete recovery has been effected to seal the substrate that it is to enclose. When the conductors 6 are in place the sleeve 1 is heated or otherwise recovered). Heating causes the solder to melt, thus connecting the conductors together and to the retaining plate 4, and also causes the adhesive ring 2 to melt and the open end of the sleeve 1 to shrink. The result is an environmentally sealed electrical connection. If desired the article may be so formed and recovered that the sleeve 1 recovers into snug engagement with the conductors over substantially the entire length of the sleeve.

The electrical connection although fully sealed, can still be tested or identified, as follows. A metal probe can be pushed through the self-sealing material 5 sufficiently far to touch the conducting retaining plate 4, the purpose of which is to provide easier electrical connection with the probe or to localise the solder. If the probe is connected to the correct circuitary, the pair of wires can be identified or tested. This is of great value in a telephone splice case where identification can be a considerable problem, since the many hundreds of pairs of wires make identification by colour coding rather difficult. When the probe is removed the seal is re-established automatically so no connections have to be re-made or no seals re-established. The size of the probe will depend on the particular use, but probes of diameter 0.3–0.6 preferably 0.4–0.5 mm may be regarded as typical.

In prior art methods after testing, the damaged section must be removed and a new bridging piece of wire inserted requiring two new connections. Alternatively, a new insulation must be provided around the damaged section.

Figure 3:
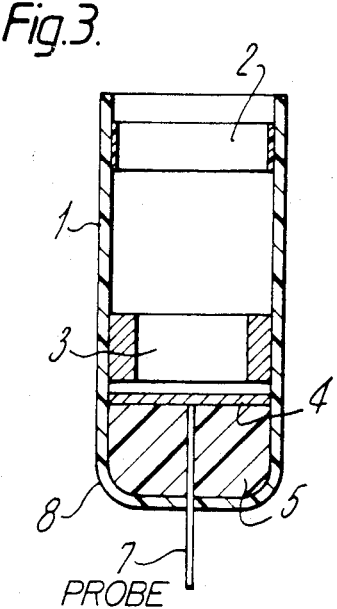
FIG. 3 is a section through a second form of device according to the invention.

FIG. 3 shows another form of device in which the recoverable sleeve 1 closed at one end. The end which is closed can thus be regarded as being closed by the self-sealing material 5 and by the extension of the sleeve itself. A probe 7 is inserted through the closed end and through the self-sealing material 5 to reach the retaining plate 4. The sleeve 1 will be in sealing engagement with, preferably bonded to, the material 5 along regions 8. As a result the self-sealing nature of material 5 will be sufficient to restore impermability to the whole device, re-sealing of the hole in the sleeve not being necessary. This embodiment is generally preferred when the self-sealing material 5 is not self-supporting, for example when it is a highly compressible foam. This arrangement also allows for easy location of the material 5.

Figure 4:
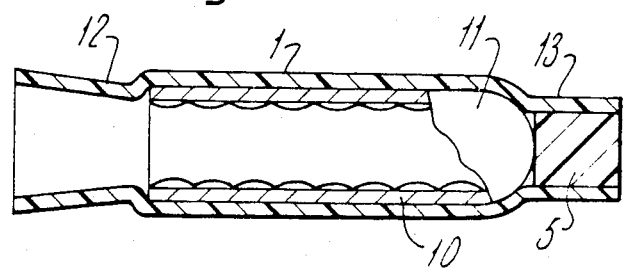
FIGS. 4 and 5 are sections through yet another form of device.
Figure 5:
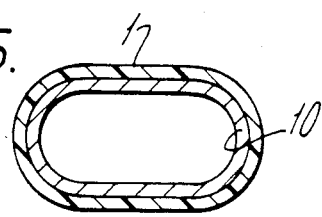

FIGS. 4 and 5 show a connector device according to the invention which comprises a heat-shrinkable sleeve 1 that encloses a copper crimp connector 10, in the form of a cap having a closed end 11. One end 12 of the sleeve 1 is open for receiving the conductors and is optionally provided with an inner lining of hot-melt adhesive (not shown). The other end 13 is provided with a plug of self-sealing material 5 for example a silicone rubber. Additionally, the internal surface of the crimp connector may be provided with a lining of waterproof grease for example of hydrocarbon based grease.

In order to form a connection between a pair of conductors, the stripped conductors are simply inserted into the open end of the sleeve 1 until they abut the inner surface of the closed end 11 of the crimp connector. The connector 10 is then crimped using a conventional crimping tool and the sleeve 1 is recovered by heating, crimping and recovery being conducted in either order. The connector may be tested by means of a test probe as described above, the probe being inserted through the self-sealing material 5 until it abuts the end 11 of the crimp connector 10.

The device shown in FIG. 5 may be used to connect wires, e.g. telephone wires, having a typical outside diameter of about 1.3 mm, in which case the sleeve 1 will typically have an overall length of about 33 mm, a maximum diameter (over the central portion) of about 3.5 mm and a minimum diameter (over the central portion) of about 2.7 mm.

Where the present invention is applied to other sealing systems, some of the illustrated features such as the solder, the retaining plate or the hot-melt adhesive need not be present. Conversely, other features could be combined with the present invention according to the particular end use. For example a self-stripping mechanism could be employed, as disclosed in U.K. Patent Application No. 8137436. Also, where solder is employed it could be localised eccentrically as disclosed in U.S. Pat. No. 4,282,396.

Figure 6:
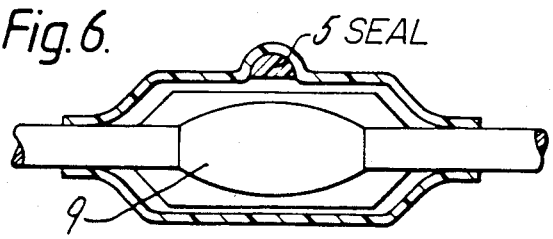
FIG. 6 is a section through a fourth form of device according to the invention.

The use of a self-sealing elastomeric material may be applied to larger enclosures, for example a spike 9 between telecommunications cables where access is occasionally required as shown in FIG. 6. In such cases, a small region of self-sealing material 5 may be sufficient, provided in for example a moulded auxiliary outlet. In this form of device a probe can be used to test pressure, to test air humidity or perform gas analysis or to pressurise the closure.

We claim:

1. A device for forming and enclosing an electrical connection between a plurality of electrical conductors, which comprises:
   (a) a hollow, dimensionally-recoverable article having a first and a second dimensionally-recoverable end portion and a central portion, the first end portion being open to allow insertion of electrical conductors therein and the second end portion having an aperture that communicates between the interior and the exterior of the article;
   (b) an arrangement for electrically connecting electrical conductors, which is located in the central portion of the article; and
   (c) a quantity of self-supporting material which is located in the second end portion and held therein by the article, wherein, at least after the article has been recovered, the material seals the aperture but can be penetrated by a probe, the material being self-sealing at least when held by the article so that it will seal the aperture after removal of a probe.

2. A device according to claim 1, in which the material is inherently self-sealing.

3. A device according to claim 1, which comprises a first heat-recoverable portion, and a second non recoverable portion that contains said self-sealing material.

4. A device according to claim 1, in which the article is in the form of a tubular sleeve.

5. A device according to claim 1, in which the article is in the form of a tubular sleeve, one end of which is closed by the said material, and the other end of which is open and has a heat-activatable adhesive.

6. A device according to claim 1, which is heat-recoverable.

7. A device according to claim 1, in which the self-sealing material is positioned such that, on partial recovery of the article, the forces of recovery cause the material to be held in place.

8. A device according to claim 1, in which the self sealing material is an elastomeric material.

9. A device for forming and enclosing an electrical connection between a plurality of electrical conductors, which comprises:
   (a) a hollow, dimensionally-recoverable article having a first and a second dimensionally-recoverable end portion and a central portion, the first end portion being open to allow insertion of electrical conductors therein and the second end portion being closed;
   (b) an arrangement for electrically connecting electrical conductors, which is located in the central portion of the article; and
   (c) a quantity of material which is located in the second end portion and held therein by the article, and which can be penetrated by a probe inserted into the second end portion of the article from the exterior thereof, the material being self-sealing at least when held by the article so that, after removal of a probe, it will seal any aperture formed in the article by a probe.

10. A device according to claim 9, which includes an electrically conductive member positioned between the self-sealing material and the arrangement for electrically connecting conductors.

11. A device as claimed in claim 9, wherein the arrangement for connecting conductors comprises a quantity of fusible electrically conductive material.

12. A device as claimed in claim 9, wherein the fusible electrically conductive material is solder.

13. A device as claimed in claim 9, wherein the arrangement for connecting conductors comprises a crimp connector.

14. A device according to claim 9, in which the article is in the form of a tubular sleeve.

15. A device according to claim 9, in which the article is in the form of a tubular sleeve, one end of which is closed by the said material, and the other end of which is open and has a heat-activatable adhesive.

16. A device according to claim 9, which is heat-recoverable.

17. A device according to claim 9, in which the self-sealing material is positioned such that, on partial recovery of the article, the forces of recovery cause the material to be held in place.

18. A device according to claim 9, in which the self sealing material is an elastomeric material.

19. A device according to claim 2, in which the self-sealing material is an insulating gel.

* * * * *

UNITED STATES PATENT AND TRADEMARK OFFICE
CERTIFICATE OF CORRECTION

PATENT NO. : 4,504,699

DATED : March 12, 1985

INVENTOR(S) : Roberto Dones, David G. Street

It is certified that error appears in the above-identified patent and that said Letters Patent are hereby corrected as shown below:

In the specification, col. 3, line 58, word "the" should read "a"

In specificaton, col. 4, line 16, word "pessure" misspelled should read "pressure"

Claim 19, col. 8, line 1: "claim 2" should read --claim 9--

Signed and Sealed this

Twenty-fourth Day of June 1986

[SEAL]

Attest:

DONALD J. QUIGG

Attesting Officer

Commissioner of Patents and Trademarks